United States Patent [19]

Kuroki et al.

[11] 4,345,457
[45] Aug. 24, 1982

[54] METHOD FOR DETECTING THE DEPTH OF CRACKS IN ROLLS USED FOR TRANSFERRING HOT STEEL INGOT BLOOM AND ROLLS USED THEREFOR

[75] Inventors: Takanori Kuroki, Munakata; Hironori Kuroki, Kitakyushu, both of Japan

[73] Assignee: Kuroki Kogyosho Co., Ltd., Fukuoka, Japan

[21] Appl. No.: 143,705

[22] Filed: Apr. 25, 1980

[30] Foreign Application Priority Data

Dec. 27, 1979 [JP] Japan .............................. 54-171782
Dec. 28, 1979 [JP] Japan .............................. 54-171630

[51] Int. Cl.³ .......................................... G01M 3/26
[52] U.S. Cl. ................................. 73/37.5; 73/104; 116/208
[58] Field of Search ................. 73/37.5, 37.6, 104, 73/40, 40.5 R; 116/208

[56] References Cited

U.S. PATENT DOCUMENTS

| | | | |
|---|---|---|---|
| 2,185,315 | 1/1940 | Rogatchoff | 73/104 X |
| 3,228,735 | 1/1966 | Stewart | 116/208 X |
| 3,490,268 | 1/1970 | Hand et al. | 73/40 |
| 3,667,862 | 6/1972 | Parr | 73/40 X |
| 3,972,223 | 8/1976 | Torghele | 73/40.5 R X |
| 4,104,906 | 8/1978 | Oertle | 73/104 |
| 4,135,386 | 1/1979 | Peterson et al. | 73/104 X |

Primary Examiner—Kyle L. Howell
Assistant Examiner—Joseph W. Roskos
Attorney, Agent, or Firm—Jordan and Hamburg

[57] ABSTRACT

A method which can readily and accurately detect the depth of cracks in the rolls for transferring hot steel ingot blooms is disclosed. In operation, a fluid of a desired pressure is fed into a plurality of elongated holes formed in the rolls, such elongated holes being disposed in a direction parallel to and along the axis of the rolls and also equidistantly below the round surface of the roll. When cracks occur and reach the elongated holes, the fluid leaks through cracks from the elongated holes and such leakage causes a change in the amount of flow of the fluid. Thereby the cracks can be readily detected by measuring such change of fluid flow by a suitable known detector.

18 Claims, 8 Drawing Figures

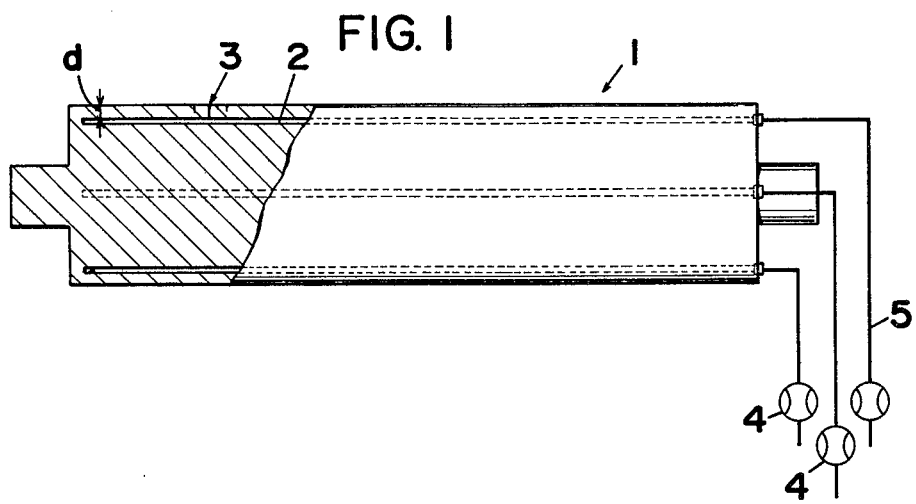
FIG. 1
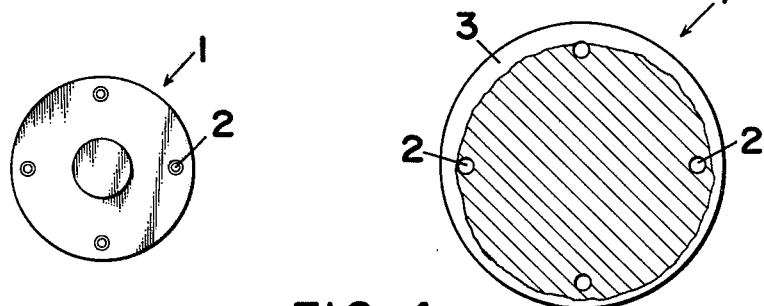
FIG. 2
FIG. 3
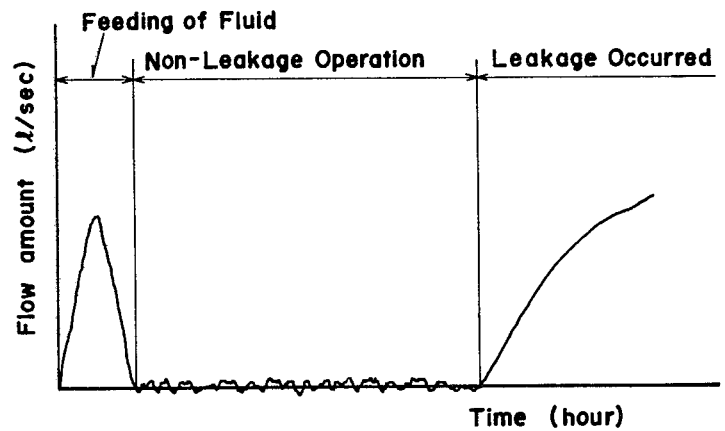
FIG. 4

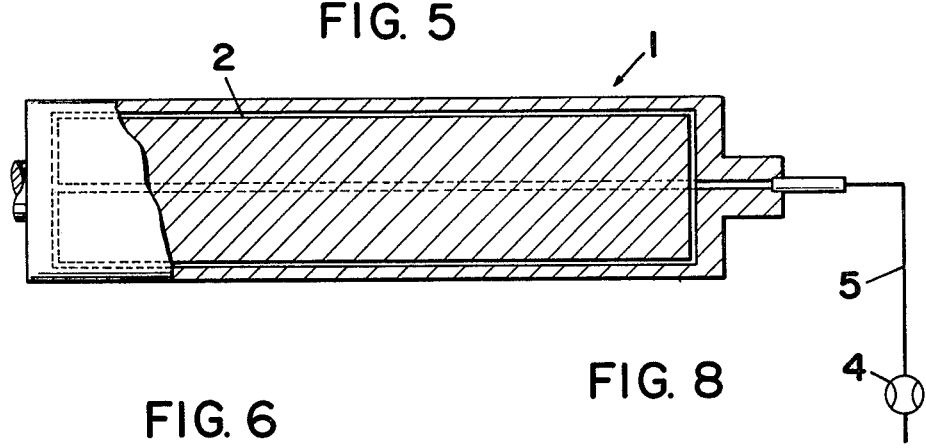
FIG. 5
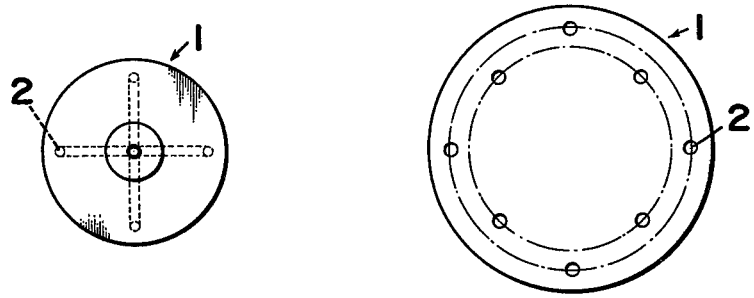
FIG. 6  FIG. 8
FIG. 7
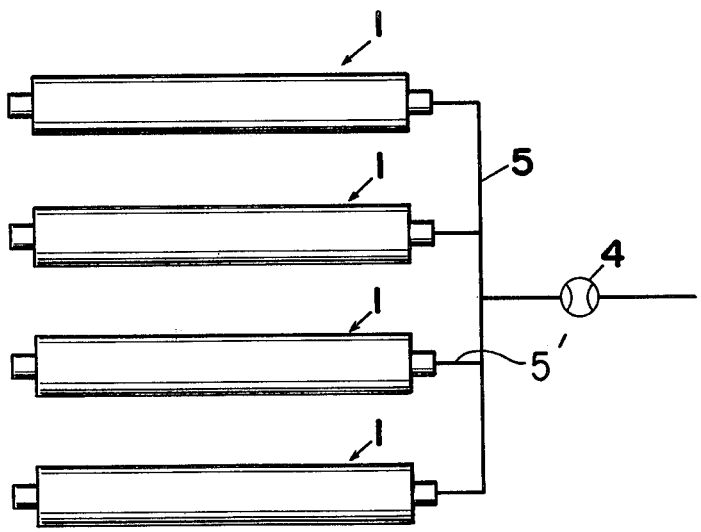

METHOD FOR DETECTING THE DEPTH OF CRACKS IN ROLLS USED FOR TRANSFERRING HOT STEEL INGOT BLOOM AND ROLLS USED THEREFOR

BACKGROUND OF INVENTION

This invention relates to a method for detecting the depth of cracks which occur and develop in the rolls for transferring hot steel ingot blooms either during or out of transferring operation and rolls specifically devised for the method.

Several methods have been heretofore been proposed for the above purpose and such known method substantially comprises:
(i) method utilizing a crack depth meter which operates with a high-frequency current,
(ii) method employing electromagnetic induction, and
(iii) ultra-sonic crack-detecting method.

However, such known methods cannot provide accurate measurement of the cracks, and this is especially true when the rolls which have been used for hot-bloom transferring operation over a considerable time are to be measured. Namely, after such long-time use, many cracks usually occur on the surface of the rolls due to the thermal fatigue making the surface of the roll very coarse. Therefore, the measurement of the depth of the cracks thereafter becomes extremely difficult or impossible.

Accordingly, it is an object of the present invention to provide a method which can readily and accurately detect the depth of cracks in the rolls, thereby providing for accurately judging the expected life of the rolls for repairing or replacing purposes.

It is another object of the present invention to provide rolls which are effectively used for the above method.

In summary, the method for detecting the depth of cracks in the bloom-transferring rolls is carried out in the following manner.

A fluid of desired pressure is fed or supplied into a plurality of elongated holes formed in the rolls. The elongated holes are substantially disposed parallel to and along the axis of each roll and also below and parallel to the round outer surface of the roll. When the cracks occur on the surface of the roll and develop toward the core of the roll, the cracks communicate with the elongated holes, thereby providing a change in the amount of fluid flow. Such change of fluid flow is detected by a suitable detecting means enabling the prompt and accurate detection of the depth of the cracks in the roll. The roll used for the above method can be of any construction so long as the elongated holes are formed therein. For example, the roll may be one which is provided with a cooling water passage on and along the axis of the roll besides the elongated holes.

BRIEF DESCRIPTION OF DRAWINGS

FIG. 1 is a plan view, partially broken away and in section, of a roll used for the method of this invention, FIG. 2 is a right side view of the above roll, FIG. 3 is an explanatory view showing the depth of cracks in the roll, FIG. 4 is a graph showing the detecting manner of "ON LINE" operation, FIG. 5 is a plan view, partially broken away and in section, of another roll used for the method of this invention, FIG. 6 is a right side view of the above roll, FIG. 7 is an explanatory view showing a modification of the detecting method of this invention, and FIG. 8 is a side view of a modification of a plurality of rolls used for the method of this invention.

DETAILED DESCRIPTION OF DISCLOSURE

The detecting of roll cracks according to the method of this invention can be carried out in either "OFF LINE" operation or "ON LINE" operation, wherein "OFF LINE" operation means that detecting is conducted with rolls out of the hot bloom transferring operation and "ON LINE" operation means that the detecting is conducted with rolls under hot bloom transferring operation.

FIG. 1 and FIG. 2 show a type of roll 1 for "OFF LINE" operation. In the drawing, the roll is cylindrical body having a solid circular cross section. A plurality of (preferably three or four) elongated holes 2 are formed below the round surface of the roll 1 in a direction parallel to and along the axis of the roll 1. The depth d of the elongated hole 2 from the round surface of the roll 1 is determined in view of the material of roll 1, the condition of the build-up welding layer, or the operating condition of the roll 1. Such depth may correspond to a critical depth, wherein the critical depth implies that the growth of the crack which extends beyond such depth may cause breakage of the roll 1. Since the roll 1 is used for "OFF LINE" operation, all the elongated holes 2 have their one longitudinal ends completely closed and the other ends open-ended respectively. The open-ended ends form the fluid inlets. The one ends of such elongated holes 2 can be closed by inserting plugs therein.

As the rolls 1 of the above construction are employed in actual operation for transferring hot steel ingot blooms, the cracks 3 may occur on the surface of the rolls 1 and gradually grow toward the core of the rolls 1 as shown in FIG. 3. When the cracks 3 reach a depth as shown in FIG. 3, the elongated holes 2 communicate with the atmosphere. In "OFF LINE" operation, the rolls 2 are first removed from the roll carrier assembly or at least are kept stationary on the carrier assembly, for periodic maintenance of the carrier assembly. The ends of the fluid supply line 5 are tightly connected with the inlets of elongated holes 2 by a suitable connecting means. Subsequently, when the fluid of a desired kind (e.g. air or water) is fed into and along such elongated holes 2 at a predetermined pressure (either positive pressure or negative pressure), the amount of fluid is considered to differ greatly between a condition in which no cracks 3 reach the elongated holes 2 and a condition in which cracks 3 reach the elongated holes 2 and thereby communicate with the elongated holes 2. Such difference or change of the flow amount may be readily detected by any desired kind of detector 4 such as a flow meter mounted in the midst of the fluid supply line 5 which has one of its ends connected with the fluids inlets of the elongated holes 2. Of course, the leakage of fluid through cracks 3 may also be recognized readily by the naked eye from the outside.

FIG. 5 and FIG. 6 show a type of roll 1 for "ON LINE" operation. Such roll 1 differs from the roll 1 of FIG. 1 and FIG. 2 in that the plurality of elongated holes 2 formed in the roll 1 are all communicated with each other and have a single inlet opening which connects such plurality of elongated holes 2 with the fluid supply line 5.

In "ON LINE" operation, the crack detecting is conducted by the manner as shown in the graph (FIG. 4), wherein the lapse of time T (hour) and the flow amount Q (liter/sec) are plotted on the abscissa and the ordinate respectively. In the graph, "Feeding of Fluid" means a first stage where fluid is fed into the elongated holes 2 of rotating rolls 1 at a predetermined pressure, "Non-Leakage Operation" means a second stage where the supply of fluid is stopped and the rolls 1 are still under bloom transferring operation without imparting the leakage of fluid from cracks and "Leakage Occurred" means a third stage where leakage of fluid occurs. The actual detecting is effected in the third stage. The zigzag pattern in the second stage indicates fluctuation of a minor amplitude caused by the change of temperature at the bloom-transferring operation site.

As described above, in the "ON LINE" operation, the detecting of the cracks which occur on the surface can be readily and continuously conducted even when the rolls are under hot-bloom transferring operation. No conventional detecting method has been successful in such continuous "ON LINE" detecting.

However, a rotary seal (or mechanical seal) may have to be used as the joint which connects the fluid supply line 5 and the elongated holes 2.

Referring now to the manner of detection according to the method of this invention, several modifications can be considered. One of such modification is disclosed in FIG. 7 wherein the fluid supply line 5 is provided with a plurality of branch lines 5', which are communicated with the inlet openings of corresponding bloom-transferring rolls disposed in parallel.

A modification also can be made as to the construction of rolls used for the method of this invention. As one modification, although not shown in the drawings, the elongated holes 2 may be separated into several groups and the elongated holes 2 in each group may be communicated with each other. In this case, the number of the inlet openings formed in the rolls corresponds to the number of the groups. As another modification, the depth of the elongated holes 2 may be varied as shown in FIG. 8, wherein the depth of the crack 3 can be accurately measured or calculated besides the prompt detecting of the cracks. Due to such provision, the delicate maintenance of the carrier assembly including the rolls can be achieved.

As has been described above, according to the method of this invention, irrespective of the hot-bloom transferring rolls being under "OFF LINE" operation or "ON LINE" operation, the growth (or the depth) of the cracks in the rolls can be readily and accurately detected. Furthermore, according to this invention, the life of each roll is determined by the degree of depth of the cracks which can be readily detected by the method of the invention, the reliability of such determination being highly enhanced as compared to conventional methods which determine the life of rolls by conventional "time control" or the rough life estimation from the surface condition of the roll.

What we claim is:

1. Method for detecting the depth of cracks in rolls used for transferring hot steel ingot blooms comprising:
   (i) supplying a fluid of desired pressure into a plurality of elongated holes formed in said roll, said plurality of elongated holes being disposed below the round outer surface of said roll and extending in a direction parallel to the axis of said roll, and
   (ii) detecting the change of the amount of flow of said fluid which is caused by the communication of cracks on said surface with said elongated holes.

2. Method for detecting the depth of cracks according to claim 1, wherein said supplying of fluid is effected while said rolls are in use transferring hot steel ingot blooms.

3. Method for detecting the depth of cracks according to claim 1, wherein said supplying of fluid is effected while said rolls are not being operationally used for transferring hot steel ingot blooms.

4. Method for detecting the depth of cracks according to claim 1, wherein said supplying of fluid is effected by a fluid supply line which has one end connected with a fluid inlet opening formed in said roll, said inlet opening communicating with said plurality of elongated holes.

5. Method for detecting the depth of cracks according to claim 4, wherein said fluid inlet opening is connected to said fluid supply line by a rotary seal joint.

6. Method for detecting the depth of cracks according to claim 4 wherein said fluid inlet opening is disposed on the axis of said roll.

7. Method for detecting the depth of cracks according to claim 1, wherein said supplying of fluid is effected by a fluid supply line which has one end connected with a plurality of fluid inlet openings formed in said roll, said inlet openings communicating with said plurality of elongated holes.

8. Method for detecting the depth of cracks according to claim 4 or 7, wherein said fluid supply line is provided with a flow meter which detects the change the amount of flow of said fluid.

9. Method for detecting the depth of cracks according to claim 1 wherein said roll is a solid.

10. Method for detecting the depth of cracks according to claim 1 comprising disposing said elongated holes at a predetermined depth from the outer surface of said roll such that a crack extending from said surface of said roll to said predetermined depth is indicative that continued usage of the roll could result in breakage of said roll.

11. Roll capable of detecting the depth of cracks therein comprising:
    (i) a cylindrical roll body having a circular cross section, and
    (ii) a plurality of elongated holes formed in said roll, said holes being disposed below the round surface of said roll in a direction parallel to the axis of said roll, said elongated holes being supplied with a fluid of desired pressure by way of a fluid supply means formed in said roll.

12. Roll according to claim 11, wherein said fluid supply means comprises a fluid inlet opening formed in said roll, said opening communicating with said plurality of elongated holes.

13. Roll according to claim 12 wherein said fluid inlet opening is disposed on the axis of said roll, and a rotary seal joint at said fluid inlet opening connecting said fluid inlet opening to said fluid supply.

14. Roll according to claim 11, wherein said fluid supply means comprises a plurality of fluid inlet openings formed in said roll, said inlet openings communicating with said plurality of elongated holes.

15. Roll according to claim 11, wherein said elongated holes vary in depth from the round outer surface of the roll toward said axis of said roll.

16. Roll according to claim 11, wherein said elongated holes are separated into a plurality of groups and said elongated holes communicating with each other in each group respectively.

17. Roll according to claim 11 wherein said roll is a solid.

18. Roll according to claim 11 wherein said elongated holes are located at a predetermined depth from the outer surface of the roll such that a crack extending from said surface of said roll to said predetermined depth is indicative that continued usage of the roll could result in breakage of the roll.

* * * * *